United States Patent [19]

Gillenwater

[11] 3,907,640

[45] Sept. 23, 1975

[54] PRODUCTION OF ALKALI METAL GLUCONATES

[75] Inventor: Donald Lee Gillenwater, Muscatine, Iowa

[73] Assignee: Grain Processing Corporation, Muscatine, Iowa

[22] Filed: Aug. 8, 1973

[21] Appl. No.: 386,785

[52] U.S. Cl.................. 195/36 R; 195/37; 195/47; 159/48 R; 260/535
[51] Int. Cl.² .......................................... C12D 1/06
[58] Field of Search ....... 195/35, 32, 36 R, 47, 105, 195/104, 37; 426/471; 159/48 R, DIG. 10; 260/535, 528

[56] References Cited
UNITED STATES PATENTS

| | | | |
|---|---|---|---|
| 3,028,426 | 4/1962 | Porret et al. ...................... | 159/48 R |
| 3,084,138 | 8/1963 | Horn et al. ........................... | 260/528 |
| 3,567,513 | 3/1971 | Hansen ............................... | 426/471 X |
| 3,576,718 | 4/1971 | Ziffer et al. ........................ | 195/36 R |

FOREIGN PATENTS OR APPLICATIONS

| | | | |
|---|---|---|---|
| 2,003,734 | 10/1970 | Germany ............................ | 195/31 R |
| 1,346,645 | 11/1963 | France ............................... | 159/48 R |

OTHER PUBLICATIONS

Chem. Abstracts 67:45463c.

*Primary Examiner*—A. Louis Monacell
*Assistant Examiner*—Thomas G. Wiseman
*Attorney, Agent, or Firm*—Neuman, Williams, Anderson & Olson

[57] ABSTRACT

Crystal-containing alkali metal gluconate solutions are spray dried to produce dry alkali metal gluconates.

5 Claims, No Drawings

PRODUCTION OF ALKALI METAL GLUCONATES

This invention relates to the production of sodium or potassium gluconate.

It is well known that gluconic acid is formed by fermentation of glucose solutions with microorganisms. Sodium or potassium gluconate salts are formed by neutralizing the gluconic acid with a base such as sodium hydroxide or potassium hydroxide. Thus, for example, an article entitled "Sodium Gluconate Production" in *Industrial Engineering Chemistry*, Vol. 44, 1952, pages 435–440, discusses pilot plant experiments in which sodium gluconate was produced directly by continuous neutralization with sodium hydroxide of gluconic acid formed during fermentation of glucose with *Asperigillus niger*.

The difficulty in obtaining these salts lies primarily in their recovery. The conventional commercial methods of recovering sodium gluconate (or potassium gluconate) involves mycelium removal by filtration, decolorization and either crystallization and centrifugation or drum drying followed by grinding and screening. Recovery by the crystallization procedure is time consuming and generally involves holding at a temperature of about 65° F. a sodium gluconate containing liquor in crystallizers for periods of from about 6 to 8 hours to develop substantial crystal growth. The crystals are then removed by centrifugation and dried in a warm air dryer. In the other procedure, a concentrated sodium gluconate solution is evaporated to a solids content of about 4.5% and then roll dried on drum dryers. The so-dried product then goes through a series of grinding and screening steps for recovery of the desired particle size sodium gluconate.

It is a principal object of this invention to provide a simplified method for recovering sodium or potassium gluconate from fermentation liquors, which method can be carried out relatively rapidly and which involves considerably less equipment and hence expense than is associated with prior recovery methods.

I have found that sodium or potassium gluconate can be recovered directly from fermentation liquors by spray drying. To my knowledge, sodium gluconate has never been successfully recovered heretofore from fermentation liquors by spray drying. My present discovery that sodium or potassium gluconate solutions can be successfully spray dried is very surprising and unexpected, based on my own past experience and confirmed by others skilled in the art. Prior to my discovery, spray drying of sodium gluconate solutions has resulted in the solutions sticking to the walls of the dryer, precluding recovery of the dried product.

I have now found that sodium or potassium gluconate solutions can be successfully spray dried provided that some degree of crystallization or crystal growth has occurred in the solution. The specific amount of crystal growth in the solution or fermentation liquor to be spray dried is not particularly critical, but some apparent crystal growth is required. In general, a solution of sodium or potassium gluconate can be successfully spray dried when the crystal growth therein ranges from about 5 to 50%, preferably 20 to 30% by volume. Crystal growth in the feed liquor can be achieved by increasing the solids content of the solution to within the range of about 45 to 60% by evaporation or adding previously dried product or by cooling the solution or by a combination of these expedients. The sodium or potassium gluconate solution should be kept agitated prior to spray drying to prevent crystal agglomeration which could possibly result in plugging of the nozzles used for introducing the solution into the dryer.

The actual spray drying of the sodium or potassium gluconate fermentation liquor can be effected in conventional spray drying equipment. However, to reduce the possibility of plugging the homogenizing type feed pumps usually employed on commercial spray dryers, it is preferred to employ spray drying equipment having two fluid nozzles. Two-fluid nozzle arrangements for spray dryers are, of course, well known. With a two-fluid nozzle arrangement air is used to disperse the feed slurry as it enters the main drying chamber and any type of suitable pump can then be used to pump the slurry to the nozzle.

Drying of sodium or potassium gluconate fermentation liquors can be conveniently accomplished using dryer exhaust air temperatures ranging from about 150° to 250° F. which correspond to inlet air temperatures ranging from about 300° to 500° F. Inlet air temperatures will, of course, vary depending upon the amount of water in the feed unless controlled. The preferred exhaust drying air temperature is from about 200° to 250° F.

An unexpected feature of this process is the ability to control particle size of the dried product. This is an important feature since different applications require various particle sizes depending on the mesh sizes of other components of the final product. Generally speaking, higher drying temperatures and/or lower crystal concentrations tend to result in increasing the particle size of the gluconate product. Moreover, those skilled in the art appreciate that some variation in the particle size distribution of spray dried products can also be influenced to a limited degree by such factors as volume of air used, the type of nozzles employed, etc.

The following numbered examples illustrate the discovery forming the present invention.

EXAMPLE I

A 50% solids solution (fermentation liquor) of sodium gluconate with no apparent crystal growth was pumped to a Bowen conical laboratory dryer at a feed rate of 300–350 milliliters per minute. The Bowen dryer was equipped with a Spraying Systems two-fluid nozzle where air up to 100 psi could be used for atomization. The inlet air temperature was varied from 350° to 450° F. and the outlet air temperature from 170° to 200° F. No dry product was recovered at any of these conditions and the inside of the dryer was glazed.

EXAMPLE II

Fermentation liquors with no apparent crystal growth containing sodium gluconate at solids level in the range of 45 to 55% were pumped to a Bowen conical laboratory dryer at a feed rate of 300–350 milliliters per minute. The Bowen dryer was equipped with an atomizing wheel, with the wheel air being variable. The inlet air temperature was about 400° F. and the outlet air temperature around 200° F. No dryer product was obtained and the inside of the dryer was coated with a sticky hard glaze.

EXAMPLE III

A 60% solids sodium gluconate feed liquor was fed to a DeLaval Model 72-12 dryer. The dryer was equipped with a DeLavan SA swirl chamber 0.044 inch orifice and the feed was fed to the dryer nozzle at pressures ranging from 2,000 to 3,000 psi using a homogenizing type feed pump. The pH of the feed was altered by adding sodium hydroxide to obtain feed pHs of 6.0, 7.0, 8.0 and 8.5. The inlet air temperature was about 375° F. and the outlet air temperature was about 180° F. None of the above conditions yielded any dryer product. The inside of the dryer was coated and hard to clean.

The above Examples I, II and III illustrate the unsatisfactory results heretofore generally obtained in attempting to spray dry sodium gluconate solutions.

EXAMPLE IV

A tank of "Premier" gluconate 60 (mixture of gluconic and sodium gluconate) (60% solids) was converted to the sodium salt by adjusting the pH to 7.0 with sodium hydroxide. The liquor was allowed to remain in the feed tank overnight and cooled with agitation. The following morning it was noted that the feed liquor contained a lot of small crystals. This crystal mixture was then spray dried as follows:
  Dryer — DeLaval 72-12
  Nozzle — DeLavan - SA swirl chamber, 0.044 orifice
  Feed pump — DeLaval Homogenizer
  Inlet Temperature — 365° F.
  Outlet Temperature — 180° F.
  Atomizing pressure — 2000–3000 psi The product dried well and was collected directly from the spray dryer. A fine white powder of ca 3.0% moisture was obtained. The powder lost moisture down to 0.5% when allowed to cool atmospherically.

EXAMPLE V

A 50 gallon aliquot of a fermentation liquor containing sodium gluconate at 55% solids and 6.6 pH was cooled to 85° F. During the cooling small crystals appeared in the liquor and the slurry was kept agitated. The lower the temperature the heavier the crystal growth appeared. This crystal slurry was then spray dried using a DeLaval spray dryer equipped with a DeLavan nozzle. Nozzle orifice size was 0.054 inch and an SB swirl chamber was used. Operating conditions were:
  Inlet temperature — 420° F.
  Outlet temperature — 185° F.
  Atomizing pressure — up to 4000 psi A dried product of sodium gluconate was obtained.

EXAMPLE VI

A fermentation liquor containing sodium gluconate was crystallized in the feed tank by cooling to ca 90° F. and spray dried. The feed solids was ca 60% and the pH was 6.6. Operating conditions used were as follows:
  Inlet air temperature — 365°–375° F.
  Outlet air temperature — 175°–180° F.
  Atomizing pressure — 2,000 psi
  NOzzle — DeLavan - 0.054 inch - SB swirl chamber The product dried readily and had a moisture of 3.5% which dropped to 0.5% when atmospherically cooled.

The procedures described in Examples IV, V and VI resulted in a highly satisfactory sodium gluconate product that dried readily. However, some difficulty was experienced with the homogenizing type feed pump employed in that the crystals prevent the valves from sealing completely resulting in somewhat erratic atomization. To eliminate this problem a ⅜ inch two-fluid nozzle was installed in the dryer and crystalline slurries were fed to this nozzle by a variable speed pump. The results of drying in this manner are given in the following four examples.

EXAMPLE VII

A solution (fermentation liquor) of sodium gluconate containing solids in the range of 50–60% was transferred to a 100 gallon kettle and cooled by putting water on the jacket. The solution was stirred continuously. As the solution cooled, small crystals of sodium gluconate became apparent in the solution. When the slurry reached a temperature of ca 85° F. it was pumped to the dryer and spray dried. Dryer conditions were as follows:
  Nozzle air pressure — 45 psi
  Nozzle feed pressure — 30 psi
  Inlet air temperature — 420° F.
  Outlet air temperature — 225° F.
  Feed pH — 6-7

The product dried easily and was collected via a pneumatic conveying system attached to the bottom of the main drying chambers and the cyclones. Finished product was light colored, free flowing and contained 0.5% moisture. The loose bulk density was 43.2 pounds per foot$^3$ and the packed bulk density was 54 pounds per foot$^3$.

EXAMPLE VIII

A second feed aliquot identical to that used in Example VII was spray dried using the following conditions:
  Nozzle air pressure — 40–45 psi
  Nozzle feed pressure — 30–35 psi
  Inlet air temperature — 400° F.
  Outlet air temperature — 220° F.
  Feed pH — 6-7

As soon as the product started drying a portion of the dry product obtained from Example VII was added back inside the main drying chamber at the top so that it would contact the wet spray before the drying was completed. Dry product recycle was equivalent to ca 15% of the solids in the feed stream.

The product dried with no difficulty and was collected via the pneumatic conveying system. The finished product contained 0.5% moisture and had a loose bulk density of 43.2 pounds per foot$^3$. The packed density was 55.0 pounds per foot$^3$.

EXAMPLE IX

A 100 gallon aliquot of gluconic acid at 60% solids was neutralized with a 50% solution of sodium hydroxide to a pH in the 6–7 range thereby forming sodium gluconate. The solution was cooled to under 100° F. and crystals began to form. The feed slurry was then pumped to the DeLaval spray dryer and dried using various conditions:
  Nozzle air pressure — 30–40 psi
  Nozzle feed pressure — 20–35 psi
  Inlet air temperature — 390°–420° F.
  Outlet air temperature — 190°–210° F.

A fine free flowing, light colored product was collected. Moistures determined during the run were 0.0%, 0.5% and 1.2%. The product bulk density was 43.5 pounds per foot$^3$ loose and 58.8 pounds per foot$^3$ packed.

EXAMPLE X

Approximately 300 gallons of a 50% solids sodium gluconate liquor was treated as follows. The liquor was cooled and to expedite crystallization a small amount of spray dried sodium gluconate was added as seed. When the crystal slurry reached 84° F. and the crystals appeared rather heavy, the slurry was spray dried using the following conditions:

- Nozzle air pressure — 55 psi
- Nozzle feed pressure — 35 psi
- Inlet air temperature — 410° F.
- Outlet air temperature — 200° F.

The product dried readily and was collected as a light colored, free flowing powder containing 0.5% moisture. The loose bulk density was recorded as 37.3 pounds per foot$^3$ and the packed bulk density as 50.1 pounds per foot$^3$.

EXAMPLE XI

A 45% solids solution of sodium gluconate was seeded with 50 pounds of previously spray dried sodium gluconate and cooled to 90° F. The crystal growth in the slurry was measured at 5% by volume. This feed slurry was pumped to a ⅜ inch DeLavan "swirl-air" two-fluid nozzle mounted in the top of the main drying chamber of a DeLaval Model 60-20 spray dryer. The atomizing air pressure was 45 psi and the feed pressure was 35 psi. Initially the product was dried with an inlet air temperature of 360° F. and an outlet air temperature of 200° F. As the run progressed the exit air temperature was raised in increments of 5° F. and product was collected from each set of conditions. The majority of the product was collected from the bottom of the main drying chamber and air conveyed to a bag collector along with the product from the cyclone. The product dried with no major problems and the screen profile on three samples was as follows:

| Exit Air Temperature | 210°F. | 215°F. | 225°F. |
|---|---|---|---|
| % on 100 mesh | 68.13 | 80.97 | 88.50 |
| % on 200 mesh | 26.68 | 18.28 | 7.31 |
| % thru 200 mesh | 5.18 | 0.74 | 4.18 |
| % Moisture | 0.5 | 0.6 | 0.6 |
| Packed bulk density lbs/ft$^3$ | 50.5 | 46.5 | 46.0 |

EXAMPLE XII

Sodium gluconate fermentation liquors were dried using different levels of crystals in the feed liquor as seed. All product was dried in a DeLaval 60-20 dryer using a ⅜ inch two-fluid nozzle with 45 psig atomizing air pressure. All product was dried with an exhaust air temperature of 230°-240° F. The only variable employed during these runs was the percentage of crystals in the feed liquor. The results obtained were as follows:

| % Crystals (Vol.) | 5% | 10% | 20% | 30% |
|---|---|---|---|---|
| +60 mesh |  | 49.65 | 22.44 | 8.5 |
| +100 mesh | 88 | 23.94 | 37.67 | 16.2 |
| +200 mesh | 8 | 14.93 | 15.60 | 28.2 |
| −200 mesh | 4 | 11.48 | 21.28 | 46.4 |
| % H$_2$O | 0.5 | 0.3 | 0.7 | 0.6 |
| Lbs/ft$^3$ | 46 | 46.2 | 50.0 | 59 |

These results indicate how particle size and bulk density can be varied using a commercial spray dryer by increasing the seed development in the feed liquor.

The dry gluconate products obtained in accordance with this invention possess good color and clarity characteristics as seen from the following:

Fermentation liquor from the same tank was subdivided into two aliquots. One aliquot was spray dried and one aliquot was drum dried.

Dry product obtained from these two different types of commercial dryers was then redissolved in deionized water at different concentrations. Color and clarity were determined on the solutions by the procedure as follows:

COLOR AND CLARITY DETERMINATION

PRINCIPLE

Measurement of solutions for color and clarity — the optimum wave length for absorption of light due to color is 450 m$\mu$. The optimum wave length for transmission of light through a colored solution is 600 m$\mu$. Thus, if the difference in absorbance between 450 m$\mu$ and 600 m$\mu$ is computed, it can be assumed that the absorbance is due to color only. A loss in percent transmittance at 600 m$\mu$ is due largely to light scattering or turbidity.

SPECIAL APPARATUS

1. Voltage regulator.
2. Beckman Spectrophotometer, Model B or equivalent.
3. Light absorption cells — 2.0 cm × 4.0 cm.

PROCEDURE

The power supply and light source should be turned on for approximately 20 minutes before measurements are made. Upon turning on the instrument the sensitivity should be set at "Stand by". The shutter should be closed. Place a cell containing water as a blank in the first compartment of the cell holder. In the second compartment place a cell holder containing approximately 25% solids solution. Set the wave length at 450 m$\mu$. Set the sensitivity to four, then adjust the instrument with the dark current knob so that the meter reading is 0% transmittance (upper scale). Set the sensitivity knob to one. Have the sample holder in the first position. With the slit closed, open the shutter, then open the slit until the meter reading is 100% transmittance and 0 absorbance. Pull out the sample holder to the last notched position and read the shutter, push in the sample holder to the first notch. The absorbance reading should be checked if the meter needle appeared to fluctuate while taking this reading. Change the wave length to 600 m$\mu$ and proceed to repeat the procedure as described above for 450 m$\mu$. In addition to recording an absorbance reading for this wave length, read also the percent transmittance (upper scale).

CALCULATIONS

The color index is defined as the color absorbed at 450 m$\mu$ by one centimeter of solution.

$$\text{Color index} = \frac{\text{O.D. at 450} - \text{O.D. at 600} \times 1000}{4 \text{ cm cell} \times \text{solids as g/ml}}$$

The percent clarity is the percent of light (600 mμ) which passes through one centimeter of syrup.

$$\text{Percent clarity} = \frac{100 - 100 - \text{Percent Transmittance (600 m}\mu\text{)}}{4 \text{ cm} \times \text{g/ml}}$$

Sodium Gluconate Color and Clarity Comparison

| Concentration | Color | | Clarity | |
| --- | --- | --- | --- | --- |
| grams/100 ml | Drum Dried | Spray Dried | Drum Dried | Spray Dried |
| 10 | 13.8 | 12.5 | 88 | 92 |
| 20 | 13.8 | 12.5 | 74 | 88 |
| 30 | 13.3 | 11.7 | 68 | 86 |
| 40 | 12.5 | 10.6 | 72 | 83 |
| 50 | 11.5 | 5.0 | 71 | 83 |

The data illustrate that the spray dried product showed less color and improved clarity which can be attributed to the drying method used.

Brightness values for the dried products obtained by spray and drum drying were measured by placing two heaping teaspoons of the products in an inverted top of a 100 × 15 millimeter petri dish. The bottom of the dish was then inverted and placed on top of the gluconate with sufficient pressure to produce a relatively smooth surface. The reflectance was measured using a Photovolt Model 610 incorporating a search unit 610-W to measure the reflectance of the surface of the gluconate. The unit was calibrated according to the manufacturer's procedures as prescribed in their publication No. 650 entitled Instructions for Reflection Tests. The values obtained by this instrument are indicative of the blue light (450–460 millimicrons) reflectance and are based on a magnesium oxide standard of 100%.

Brightness Values of Sodium Gluconate Samples

| Sample No. | Reflectance Value | |
| --- | --- | --- |
|  | Spray Dried | Drum Dried |
| A | 76,76 |  |
| B |  | 62,62 |
| C | 75,76 | 69,70 |
| D | 75,75 | 64,65 |
| E | 66,67 | 51,53 |

When a sample of spray dried product was tested and compared with a sample of commercial crystalline product, identical reflectance values of 76 were obtained.

Sodium or potassium gluconates are widely used throughout the industry as chelating or sequestering agents for metal ions, primarily in alkaline solutions. As such, the gluconates are one of the principal ingredients used in the formulation of industrial cleaning products. These products have found applications in the dairy and soft drink industries for washing bottles, in de-rusting or descaling processes such as cleaning boilers or radiators, in the prevention of iron stains in the manufacture of paper and textile products and as an ingredient in cleaning solutions for food plants. Other applications in this connection are metal cleaning before plating, painting or other coating processes.

From the above it is apparent that contrary to existing knowledge in the art, sodium gluconate solutions can be successfully spray dried. The invention makes it possible to recover directly from fermentation liquors sodium or potassium gluconate which is a dry, free flowing product of good color. The disclosed process is simple and eliminates the need for various crystallizers, centrifuges, grinding and screening apparatus and so forth normally required in prior art methods.

Those modifications and equivalents which fall within the spirit of the invention are to be considered a part thereof.

What is claimed is:

1. A process which comprises subjecting to spray drying a crystal-containing solution of an alkali metal gluconate containing crystals in an amount of about 5 to 50% by volume and recovering a substantially dry alkali metal gluconate.

2. The process of claim 1 wherein the alkali metal gluconate is sodium gluconate.

3. The process of claim 1 wherein the alkali metal gluconate is potassium gluconate.

4. The process of claim 1 wherein the crystal-containing solution of alkali metal gluconate contains crystals in an amount of from about 20 to about 30% by volume.

5. In the process of producing alkali metal gluconate salts wherein fermentation of glucose with microorganisms is effected to produce gluconic acid and the so-produced gluconic acid is converted to a salt by neutralization with an alkali metal base, the improvement which comprises causing the formation of crystal growth in the fermentation liquor containing an alkali metal gluconate to provide a crystal concentration of from about 5 to about 50% by volume and spray drying the said crystal-containing fermentation liquor.

* * * * *

UNITED STATES PATENT OFFICE
CERTIFICATE OF CORRECTION

PATENT NO. : 3,907,640
DATED : September 23, 1975
INVENTOR(S) : Donald Lee Gillenwater It is certified that error appears in the above-identified patent and that said Letters Patent are hereby corrected as shown below:

Column 1, line 31, "4.5%" should be -- 45% --

Column 5, line 62, in the column of the table under "20%", "22.44" should be -- 25.44 --

Signed and Sealed this
second Day of December 1975

[SEAL]

Attest:

RUTH C. MASON
Attesting Officer

C. MARSHALL DANN
Commissioner of Patents and Trademarks